3,544,501
FIBER COATING COMPOSITIONS
Charles Fearnley and Thomas Ivor Jones, Cheshire, England, assignors to Geigy Chemical Corporation, Ardsley, N.Y., a corporation of New York
No Drawing. Continuation-in-part of application Ser. No. 416,648, Dec. 7, 1964. This application Nov. 13, 1967, Ser. No. 682,589
Int. Cl. C08f 45/24; C09d 5/02
U.S. Cl. 260—29.6
4 Claims

ABSTRACT OF THE DISCLOSURE

Aqueous dispersions of polystyrene or styrene copolymers containing an N-long-chain alkyl betaine as an emulsifying agent impart soil resistance to and prevent deterioration in the appearance of fibers and fiber assemblies such as carpets.

CROSS-REFERENCE TO RELATED APPLICATIONS

This application is a continuation-in-part of our patent application Ser. No. 416,648 filed Dec. 7, 1964, now abandoned.

BACKGROUND OF THE INVENTION

Field of the invention

The present invention relates to compositions for treating fibers or fiber assemblies to improve the appearance and/or inhibit the deterioration of the appearance thereof, and in particular to anti-soiling compositions for coating fibers or fiber assemblies to prevent or decrease soiling when in use.

Description of the prior art

It is known to impart a certain soil resistance to the pile of a fiber or fiber assembly such as a carpet by applying to the surface of the pile a dilute colloidal water solution of a specified non-film-forming synthetic resin to form a coating of discrete particles confined substantially to the outer, exposed portions of the pile yarns forming the pile elements and drying the treated pile at an elevated temperature, the resin being polyvinyl chloride, polyvinyl acetate, a vinyl chloride-vinylidene chloride copolymer, polystyrene or a styrene-butadiene copolymer and having a softening point of at least about 175° F. and a particle size in the latex ranging from 0.01 to 0.1 microns, the coating ranging in weight from about 0.1 ounce to about 1.0 ounce per square yard of pile surface and the drying exposing the resin coating to a temperature below the softening point of the resin. A serious drawback of carpets rendered soil resistant by this known method is that the coating imparting said resistance is dusted off very rapidly and may cause serious changes in the color of the treated carpet.

It is also known in U.S. Pat. 2,835,582, to produce polymeric hydrosols compatible with gelatin and suitable for use in the production of photographic articles, by polymerizing monoethylenically unsaturated monomers such as acrylonitrile or alkyl acrylate or mixtures thereof. The polymerization is optionally effected in the presence of an N-alkyl betaine and may be carried out in aqueous solutions having a wide range of pH value. However, the pH value of the polymer products of U.S. Pat. 2,835,582 when mixed with gelatin were shown to be critical in order that a compatible mixture could be achieved. Thus ethyl acrylate—acrylonitrile polymers containing n-octadecyl dimethyl betaine having a pH value of from 5 to 9 were shown to be compatible with gelatin whereas similar polymers having pH values of 3 and 11 respectively were shown to be incompatible with gelatin.

However, when acrylonitrile and alkyl acrylate monomers are replaced by styrene in the polymerization process, a polymeric product is obtained which is unexpectedly incompatible with styrene over a wide range of pH values including the range of from 3 to 11.

SUMMARY OF THE INVENTION

We have found that for the purpose of producing polystyrene compositions useful as anti-soiling compositions for fibers or fiber assemblies, it is particularly and unexpectedly advantageous to employ the polystyrene in the form of an aqueous dispersion, the composition containing a particular type of organic emulsifying agent defined in detail hereinafter, and of a particular particle size range and incompatible with gelatin.

Accordingly, the present invention comprises a composition for application to a fiber or fiber assembly to improve the appearance or inhibit the deterioration of the appearance thereof, which comprises an aqueous dispersion of polystyrene, or a copolymer having at least 95% by weight of styrene as defined below, containing as emulsifying agent a betaine compound having the formula:

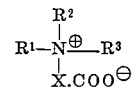

wherein:

$R^1$ is a straight or branched-chain alkyl or alkenyl group containing from twelve to twenty carbon atoms, $R^2$ and $R^3$ are the same or different and each is an alkyl group containing up to five carbon atoms but preferably alkyl of from 1 to 2 carbon atoms, and X is an alkylene group containing up to five carbon atoms, and preferably —$(CH_2)_n$—wherein $n$ ranges from 1 to 2, or a mixture of two or more such betaine compounds, substantially all the particles of the dispersed polystyrene having diameters within the range of from 0.1 to 0.25 microns, and the dispersion being incompatible with gelatin.

We have found that this range of polymer particle size is in a critical relationship to the resistance of the coating to dusting. In contrast to known coatings, those according to the invention cannot be dusted off easily and hence offer much longer protection to the fiber material coated therewith.

The present invention also comprises a method of treating a fiber or fiber assembly to improve the appearance or inhibit the deterioration of the appearance thereof, which comprises applying to the surface of the fiber or fiber assembly a composition comprising an aqueous dispersion of polystyrene or of a polystyrene copolymer containing as emulsifying agent a betaine as hereinbefore defined. The invention also comprises a fiber or fiber assembly when so treated.

DETAILED DESCRIPTION OF THE INVENTION AND PREFERRED EMBODIMENTS THEREOF

In the case of the composition of the instant invention being an aqueous dispersion of polystyrene, the polymer is preferably un-crosslinked material of high molecular weight, that is, within the range conventionally obtained by emulsion polymerisation, especially within the range of from about 150,000 to 2,000,000. According to another embodiment of the invention, instead of using polystyrene, a copolymer of styrene with up to 5% by weight, and preferably up to 2% by weight, of divinylbenzene, or of an acrylic or methacrylic alkyl ester, amide or acid is employed. The amount of the comonomer used is such that a non-film-forming copolymer is produced on drying below 120° C. If the copolymer contains an alkyl acrylate, the alkyl group desirably contains from two to ten carbon atoms and the acrylate is, for example, ethyl, n-butyl, isobutyl or 2-ethylhexyl acrylate.

The styrene polymer or copolymer is produced by a conventional emulsion polymerization method. Styrene monomer is, for example, polymerized in aqueous medium in the presence of ferric chloride and hydrogen peroxide, the betaine compound emulsifying agent being present as sole stabilizer or as a substantial part of the stabilizer system during the polymerization of monomeric styrene to proudce a dispersion of polymeric styrene. Instead of using ferric chloride and hydrogen peroxide, other redox systems, for instance persulfate-bisulfite or persulfate-ferrous iron, may be used for catalyzing the polymerization.

The dispersion should preferably contain from about 15% to 60% by weight of total resin solids. A particularly preferred content is of about 40% by weight of the polystyrene polymer or copolymer. The dispersion may also, if desired, contain, in addition to the betaine compound or compounds of Formula I, a cationic, anionic or non-ionic surface active agent, these materials being added before polymerization takes place, to improve the wetting-out property of the betaine compound. The content of such surface active agent is preferably in the range of from 0.05% to 5% by weight based on the total weight of the dispersion.

The betaine compound or compounds used as emulsifying agent may be, for example, an N-alkyl-betaine such as N-hexadecyl betaine. The betaine compound or compounds may have Formula I in which $R^2$ and $R^3$ are, for example, a methyl or ethyl group and X is, for example, a methylene or ethylene group. The alkyl or alkenyl group $R^1$ contains from twelve to twenty carbon atoms and may be, for example, lauryl myristyl, hexadecyl, stearyl or oleyl; in the case of $R^1$ being alkenyl, this group preferably contains only one ethylenically unsaturated double bond. If $R^1$ is lauryl or another alkyl group toward the lower limit of the specified range of carbon atoms, the betaine compound may tend to cause undesirable foaming of the polymer dispersion; therefore, a cationic surfactant, such as cetyl pyridinium chloride or cetyl trimethyl-ammonium bromide, should be added to inhibit this tendency.

Instead of a single betaine compound of Formula I, a mixture of two or more such betaine compounds may be used in the invention. The betaine material employed in the invention may be, for instance, a blend of N-alkyl-betaines in which the alkyl groups contain 12, 14, 16 and 18 carbon atoms per group. The blend of betaine compounds can be adjusted to give an average $R^1$ group chain length to fall within the range of from twelve to twenty carbon atoms.

The concentration of the betaine compound or compounds in the composition of the invention may vary within a wide range, but preferably the concentration is within the range from 0.5% to 5% by weight based on the total weight of the composition, a concentration of the order of 2% being particularly preferred.

The composition may be applied to the fiber or fiber assembly by any convenient method. The composition may be sprayed, padded or brushed on, or the fiber or fiber assembly may be impregnated with the composition. A convenient method of application is to pass the fiber or fiber assembly through a bath containing the aqueous dispersion conveniently by means of a roller applicator. After being contacted with the dispersion, the fiber or fiber assembly is preferably immediately dried, and may then be subjected to a brushing operation, if desired, to improve the finish or to remove excess polymer, although this brushing is generally only necessary if, for example, the surface pile of a carpet has been deformed. The composition is preferably applied so that the finished fiber or fiber assembly has a final solid resin coating ranging in weight from about 0.01 gram to 30 grams per square meter of finished surface.

The fiber or fiber assembly may be composed of or comprise a variety of vegetable or synthetic fibers or a mixture thereof, for example, cotton, jute, regenerated cellulose, acetate rayon, or a polyamide, polyester, polyolefine, polyvinylidene chloride or polyacrylic fiber, or a mixture of a vegetable and/or synthetic fiber with wool. The fiber assembly may be, for instance, a pile yarn made from such fibers or fiber mixtures, for example, rugs, tufted carpets and other carpeting materials.

While the invention is primarily directed to an antisoiling composition to methods of applying the composition and to the fiber or fiber assembly so treated to enhance its soiling resistance, the application of the composition may also be result in otherwise enhancing the appearance of the fiber or fiber assembly, or instance by imparting a de-lustered finish. The finish described herein may give a dull (matt) delustering finish on textile yarns and fabrics. This effect is especially notable on bright viscose and other bright yarns, and on white yarns and fabrics; the delustering action in general enhances the white appearance. If however, the delustering dispersion of the invention is applied to a colored yarn or fabric, some lightening in the shade of the colored yarn or fabric may be noted. This change in shade can be minimized by the co-application, with the dispersion of the invention, of a cationic softening or wetting agent. The softening or wetting agent is preferably present in the dispersion in a proportion in the range of from 2% to 25% by weight based on the total weight of dispersion. Examples of such agents which may be added include the acetate of a condensation product of stearic acid and diethylene triamine, the acetate of a condensation product of stearic acid and diethanolamine, oleyl imidazoline and stearyl imidazoline. The inclusion of a cationic fiinshing agent of this type may also improve the handle and resilience of the yarn or fabric.

The following non-limitative examples further illustrate the present invention. Parts are given therein by weight unless stated otherwise and bear the same relation to parts by volume as do kilograms to liters. Percentages are expressed by weight unless stated otherwise. Temperatures are given in degrees centigrade.

EXAMPLE 1

14.0 parts of n-hexadecyl betaine of the formula:

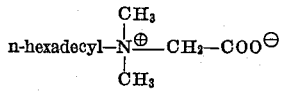

are dissolved in 395 parts of water and 280 parts of styrene monomer (stabilized with 14 parts per million of tertiary butyl catechol) are added. The resulting mixture is heated to 60° and a solution of 0.0028 part of ferric chloride dissolved in 25 parts of water is slowly added. The temperature of the mixture is then raised to 70° and 0.56 part of "10-volumes" hydrogen peroxide solution is added. The mixture is then heated to 80° and maintained at this temperature for 2 hours, during which time a further 5.0 parts of the hydrogen peroxide solution are introduced. The temperature of the resulting mixture is then maintained at 90° for 1 hour.

The dispersion of the polystyrene thus produced is cooled 30° to and filtered through a 100-messh filter. 680 to 700 parts of polystyrene are thus produced as a 40%-total resin solids dispersion. The product is a liquid having a bluish white appearance and a slight odor of residual styrene. The majority of the particles is less than 1 micron in diameter and electron microscopy shows that substantially all the particles have diameters in the range of 0.12 to 0.14 micron.

This example describes the production of a typical polystyrene latex for de-lustering and anti-soil purposes.

A 20% by weight aqueous solution of gelatin (photographic grade) was prepared by dissolving 100 parts by weight of gelatin in 400 parts by weight of distilled water.

100 parts by weight of the dispersion of polystyrene produced as above was added, with stirring at 35° C. to 200 parts by weight of the gelatin solution. It was noted that a homogeneous mixture was not obtained and consequently it was clear that the components were not compatible, as evidenced by the hazy appearance of the gelatin/polymer mixture.

In a further experiment, a solution of 5 grams of ether-washed technical grade, N-n-dodecyl, N,N-dimethyl betaine in 500 milliliters of hot tap water was adjusted to pH 4 with acetic acid, and placed in a 2-liter 3-necked flask equipped with a thermometer, a dropping funnel and a mechanical stirrer. The flask was heated to 80° C. on a steam-bath. 0.63 gram of potassium persulfate was added, and 127 grams of styrene were added dropwise with stirring over a period of 45 minutes. A hydrosol resulted which contained 3.2 grams of coagulum and which after filtration to remove the coagulum was found to be incompatible with gelatin as evidence by the hazy appearance of the gelatin/polymer mixture.

Thus polystyrene dispersions derived from the process preferred in the present application and also a process described in the prior art are both incompatible with gelatin.

EXAMPLE 2

Similar useful latexes are obtained by repeating Example 1 but using in lieu of the betaine employed therein equivalent amounts of the following betaines:

(1) N-n-dodecyl-N,N-dimethyl betaine (Seistri Shinya, J. Agric-Chem. Soc. of Japan 33 362–365 (1959));
(2) N-palmityl-N,N-dimethyl betaine, U.S. Pat. 2,835,582 (1958).

Each of the products was incompatible with gelatin giving hazy mixtures.

EXAMPLE 3

The procedure described in Example 1 is repeated using the same reactants and under the same reaction conditions, with the exception that the monomer used is a mixture of 273 parts of styrene and 7 parts of divinyl benzene (as a 65% mixture in ethylvinyl benzene).

The solid polymer obtainable from the dispersion thus produced is insoluble in conventional organic solvents including perchlorethylene and white spirit. The resin dispersion contains about 40% total resin solids.

The dispersion had low viscosity and a bluish white appearance and was incompatible with gelatin giving a mixture of hazy appearance. The particle size is less than 1 micron in diameter, and electron microscopy shows that substantially all the particles have diameters in the range of 0.14 to 0.16 micron.

EXAMPLE 4

Other similarly useful latexes are obtained by repeating Example 1 employing each of the betaines described in Example 1 and 2, respectively, and, in lieu of the monomer mixture of styrene and divinyl benzene used therein, an equivalent amount of a mixture, in equal proportions, of styrene and (a) methyl acrylate
(b) methyl methacrylate
(c) acrylic amide
(d) methacrylic amide
(e) acrylic acid, and
(f) methacrylic acid, respectively.

Each of the products was incompatible with gelatin giving mixtures of hazy appearance.

EXAMPLE 5

A white carpet composed of jute backing and viscose rayon pile is padded with a mixture of 20 parts by volume of the dispersion produced as described in Example 1 and 980 parts of water at room temperature (20°), to give an increase in weight of 100% after padding. The carpet is then dried at 70°.

Comparative soiling test

A sample of carpet of the same type thus treated, together with a sample of the same carpet treated in the known manner described hereinbefore, was subjected to the following soiling test:

The carpet samples were tumbled for one hour in a steel can on a Launder-Ometer tumbling-action washing-machine at 25° with 2% by weight of filtered vacuum cleaner dirt based on the weight of the carpet, followed by vacuum cleaning in the usual manner. The treatment was carried out three consecutive times. Assessment of the condition of the carpet was made by visual observation.

The untreated carpet after this test showed a severe deposition and retention of soil, whilst the treated carpet after this test showed only very slight soiling and substantially retained its original color and appearance.

EXAMPLE 6

A white carpet composed of jute backing and viscose rayon pile is padded with a solution of 15 parts by volume of the dispersion produced as described in Example 1, 5 parts by volume of a 25% aqueous dispersion of acetate of a condensation product of stearic acid and diethylene triamine (molar ratio about 1:1) as softening agent, and 980 parts of water at room temperature to give an increase in weight of 100% after padding. The carpet is then dried at 70°.

A sample of a carpet of the same type thus treated together with a sample of the same carpet treated in the known manner described hereinbefore, is subjected to the soiling test described following Example 5. The untreated carpet after this test showed a severe deposition and retention of soil, whilst the treated carpet after this test showed only very slight soiling and substantially retained its original color and appearance.

EXAMPLE 7

A white carpet composed of jute backing and nylon pile is padded with a solution of 20 parts by volume of the dispersion produced as described in Example 1 and 980 parts of water at room temperature to give an increase in weight of 100% after padding. The carpet is then dried at 70°.

A sample of a white jute-backed nylon carpet thus treated together with a sample of the same carpet treated in the known manner described hereinbefore, was subjected to the soiling test after Example 5. The untreated carpet, after this test, showed a severe deposition and retention of soil, whilst the treated carpet after this test showed only very slight soiling and substantially retained its original color and appearance.

EXAMPLE 8

A white carpet composed of jute backing and nylon pile is padded with a solution of 15 parts by volume of the dispersion produced as described in Example 1, 5 parts by volume of the softening agent used in Example 6 and 980 parts of water at room temperature to give an increase in weight of 100% after padding. The carpet is then dried at 70°.

A sample of a white jute-backed nylon pile carpet thus treated together with a sample of the same carpet in the known manner described hereinbefore, was subjected to the soiling test described in Example 5. The untreated carpet, after this test, showed a severe deposition and retention of soil, whilst the treated carpet after this test showed only very slight soiling and substantially retained its original color and appearance.

EXAMPLE 9

A carpet dyed dark green and composed of jute backing and a pile consisting of 42.5% viscose, 62.5% wool and 15% nylon is padded with a solution of 20 parts by volume of the dispersion produced as described in Example 1 and 980 parts of water at room temperature to give an increase in weight of 100% after padding. The carpet is then dried at 70°. The carpet thus treated shows a slight alteration in shade, this being a general lightening in color.

A sample of a carpet of the same type, thus treated, together with a sample of the same carpet treated in the known manner described hereinbefore, was subjected to the soiling test described in Example 5. The untreated carpet, after this test, showed severe deposition and retention of soil, whilst the treated carpet after this test showed only very slight soiling.

EXAMPLE 10

A carpet dyed dark green and composed of jute backing and a pile consisting of 42.5% viscose, 42.5% wool and 15% nylon is padded with a solution of 15 parts by volume of the dispersion produced as described in Example 1, 5 parts by volume of the softening agent used in Example 6 and 980 parts of water at room temperature to give an increase in weight of 100% after padding. The carpet is then dried at 70°. The carpet shows no alteration in shade after this treatment.

A sample of a carpet of the same type, thus treated, together with a sample of the same carpet treated in the known manner described hereinbefore, was subjected to the soiling test described in Example 5. The untreated carpet, after this test, showed severe deposition and retention of soil, whilst the treated carpet, after this test, showed only very slight soiling.

EXAMPLE 11

A carpet dyed red and composed of jute backing and nylon pile is padded with a solution of 20 parts by volume of the dispersion produced as described in Example 3 and 980 parts of water at room temperature, to give an increase in weight of 100% after padding. The carpet is then dried at 70°.

A sample of a carpet of the same type, thus treated, together with a sample of the same carpet treated in the known manner described hereinbefore, was subjected to the soiling test described in Example 5; the untreated carpet, after this test showed severe deposition and retention of soil, whilst the treated carpet after this test showed only very slight soiling. The treated carpet exhibited only a slight shade change and a slight dusting of the pile.

EXAMPLE 12

A carpet dyed red and composed of jute backing and nylon pile is padded with a solution of 15 parts by volume of the dispersion produced as described in Example 3, 5 parts by the volume of the softening agent used in Example 6 and 980 parts of water at room temperature to give an increase in weight of 100% after padding. The carpet is then dried at 70°.

A sample of a carpet of the same type, thus treated, together with a sample of the same carpet treated in the known manner described hereinbefore, was subjected to the soiling test described in Example 5. The untreated carpet, after this test, showed severe deposition and retention of soil, whilst the treated carpet after this test showed only very slight soiling. The treated carpet retained its original color and appearance and gave no dusting of the pile.

EXAMPLE 13

A yellow dyed Acrilan acrylic fiber pile carpet is sprayed with a solution of 1.5 parts of the dispersion as prepared in Example 1 and 0.5 parts of the softening agent used in Example 6 in 98 parts of water until there is a weight increase of 100%. The carpet is then air dried.

Comparative soiling test

Samples of a carpet of the same type, treated in the known manner described hereinbefore and samples of the same carpet treated as described in Example 11, were laid down on the floor and subjected to wearing tests of 14,000 treads, the carpets being vacuum cleaned regularly. On completion of the wearing trial it was shown that the amount of soiling of the treated carpet was considerably less than that shown on the untreated carpet. The process was repeated for pink and white Acrilan carpets and all the results showed that the treated carpets retained less soil that the untreated carpet. The amount of soiling was determined by visible assessment.

Similar results are obtained with a carpet having a polyethylene terephthalate (e.g. Terylene) pile in lieu of the Acrilan pile carpet used in this Example.

EXAMPLE 14

A white nylon pile carpet (6.6 nylon) is sprayed with a solution of 1.5 parts of the dispersion as prepared in Example 1 and 0.5 parts of the softening agent used in Example 6 in 98 parts of water until there is a weight increase of 100%. The carpet is then air dried.

Samples of a carpet of this type, treated in the known manner described hereinbefore and of the same carpet treated as described in Example 14, were laid down on the floor and subjected to a wearing test of 14,000 treads, the carpets being vacuum cleaned regularly. On completion of the wearing tests it was shown that the amount of soiling of the treated carpet was considerably less than that shown on the untreated carpet. The process was repeated for a fawn carpet (6.6 nylon) and the results showed that the treated carpet retained less soil than the untreated carpet. The amount of soiling was determined by visible assessment.

EXAMPLE 15

A fabric made from a bright spun viscose rayon, and dyed to a deep red shade, is padded with a solution of 4 parts by volume of the dispersion produced as described in Example 1 and 96 parts of water at room temperature to give an increase in weight of 100% after padding. The fabric is then dried at 70°. After drying, the fabric is delustered and there is a significant change in shade to a less deep shade than that of the untreated fabric.

EXAMPLE 16

A fabric made up from a bright spun viscose yarn and, dyed to a deep red shade, is padded with a solution of 3 parts by volume of the dispersion produced as described in Example 1, 1 part of the softening agent described in Example 4 and 96 parts of water at room temperature to give an increase in weight of 100% after padding. The fabric is then dried at 70°. After drying, the fabric is evenly delustered and there is no significant shade difference between the treated and untreated viscose material.

EXAMPLE 17

Comparative soiling test (A) An emulsified aqueous dispersion of polystyrene was prepared substantially according to the procedure described in Example 1 but using, as emulsifier, a mixture of sodium dodecyl benzene sulfonate and sodium lauryl sulfate instead of N-hexadecyl betaine. Thus 10.5 parts of sodium dodecyl benzene sulfonate and 3.5 parts of sodium lauryl sulfate were dissolved in 365 parts of water and 28 parts of styrene monomer (stabilized with 14 parts per million of tertiary butyl catechol) were added thereto. The temperature of the mixture was raised to 60° C. and 1.2 parts of potassium persulfate dissolved in 20 parts of water were added. The mixture was heated to 72° C. whereafter the addition of 252 parts of styrene monomer was commenced. The monomer was added over a period of 1½ hours, the temperature of the mixture being maintained at 80° C. during this time. Upon completion of this monomer addition, a further 1.2 parts of potassium persulfate dissolved in 20 parts of water were added. The resulting mixture was heated to 90° C. and maintained at this temperature for 1 hour.

The dispersion of polystyrene so produced was cooled to 30° C. and filtered through a 100-mesh filter. 680 to 700 parts of polystyrene were thus produced as a 40% total resin solids dispersion. The product was a liquid having a bluish white appearance and a slight odor of residual styrene. Electron microscopic examination of the dispersion so produced showed that the average polymer particle size was 0.05 micron.

In this experiment potassium persulfate was employed as polymerization initiator due to the incompatibility of the ferric chloride hydrogen peroxide system with the emulsifiers.

(B) A sample of carpet was then treated with the polystyrene dispersion of Example 1 of of the application in the following manner. 24 parts of the said polystyrene dispersion dissolved in sufficient water to make up 900 parts by volume of aqueous solution. This solution was then placed in the reservoir of a conventional carpet shampoo applicator consisting of a liquid reservoir mounted on a long handle and feeding the liquid onto a felt roller. By means of the roller applicator, the polymer solution was applied to a strip of white nylon 6:6 pile carpet. The applicator was rolled back and forth three times over the treated strip of carpet. The area of carpet treated in this way was approximately 300 square inches which corresponds to 131 parts by weight of nylon.

The treated carpet was next dried at 25° C. and subsequently vacuum cleaned in order to remove any residual dried polymer.

A similar procedure to that described under (B) above was carried out in order to treat strips of the same carpet sample with aqueous solutions prepared from the polymer described under (A) above.

In order to facilitate visual comparison, the treated strips were arranged so that an untreated strip of carpet remained between each pair of treated strips.

Once the treatment of the carpet was completed, the carpet was laid on the floor and submitted to a treading test consisting of approximately 1,000 treads. At the end of this test, the carpet was again vacuum cleaned in order to remove any loose surface dirt.

The strip of carpet treated with the polymer dispersion of Example 1 showed excellent soil resistance in sharp contrast to that treated with the dispersion described under (A) above. This test demonstrates well the criticality of the polymer particle size of the polystyrene component of the composition of the instant application.

What we claim is:

1. A method of treating a fiber material to inhibit deterioration of the appearance thereof, which comprises applying to the surface of the fibers of said fiber material a fiber-coating composition, which comprises an aqueous dispersion of a member selected from the group consisting of polystyrene and a copolymer having at least 95% by weight of styrene, said dispersion containing from about 15% to 60% by weight of total resin solids, and, in said aqueous dispersion, as emulsifying agent, from about 0.5% to 5% by weight based on the total weight of the composition of a betaine component of the formula:

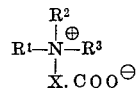

wherein $R^1$ is a member selected from the group consisting of alkyl of from 12 to 20 carbon atoms and alkenyl of from 12 to 20 carbon atoms, each of $R^2$ and $R^3$ is alkyl of from 1 to 5 carbon atoms, and X is alkylene of from 2 to 5 carbon atoms, substantially all the particles of the dispersed polystyrene having diameters within the range of from about 0.1 to 0.25 microns.

2. A method as defined in claim 1 wherein the composition is applied so that the finished fiber material has a resin coating ranging in weight from 0.01 gram to 30 grams per square meter of finished surface.

3. A method as claimed in claim 1 wherein the fiber material comprises a member selected from the group consisting of cotton, jute, viscose rayon, acetate rayon, polyamide fibers, polyester fibers, polyolefine fibers, polyvinylidene chloride fibers, polyacrylic fibers, a mixture of a vegetable fiber with wool, and a mixture of one of the aforesaid fibers with wool.

4. A soiling-resistant fiber material consisting essentially of:
   (a) a fiber material selected from the group consisting of cotton, jute, viscose rayon, acetate rayon, polyamide fibers, polyester fibers, polyolefine fibers, polyvinylidene chloride fibers, polyacrylic fibers, a mixture of a vegetable fiber with wool, and a mixture of one of the aforesaid synthetic fibers with wool; and
   (b) a coating on the fibers of said material produced by applying to the surface of the fibers of said fiber material a fiber-coating composition which comprises an aqueous dispersion of a member selected from the group consisting of polystyrene and a copolymer having at least 95% by weight of styrene and in said aqueous dispersion, as emulsifying agent, betaine component of the formula:

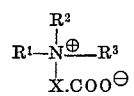

wherein $R^1$ is a member selected from the group consisting of from 12 to 20 carbon atoms and alkenyl of from 12 to 20 carbon atoms, each of $R^2$ and $R^3$ is alkyl of from 1 to 5 carbon atoms, and X is alkylene of from 2 to 5 carbon atoms, substantially all the particles of the dispersed polystyrene having diameters within the range of from 0.1 to 0.25 microns.

References Cited
UNITED STATES PATENTS 2,729,622   1/1956   Albiactt, et al.
　　　　　　　　　　260—89.7 N (digest)
2,835,582   5/1958   Fowler, Jr. et al.
　　　　　　　　　　260—29.6 EMN (digest)

FOREIGN PATENTS 1,033,908   6/1966   Great Britain.

JULIUS FROME, Primary Examiner
J. B. EVANS, Assistant Examiner

U.S. Cl. X.R.

8—115.6; 117—138.5, 140, 161; 252—8.6; 260—41